(12) United States Patent
Yu

(10) Patent No.: US 7,006,818 B1
(45) Date of Patent: Feb. 28, 2006

(54) SYSTEM AND METHOD OF PROVIDING PUBLIC VOICEMAIL SERVICE TO PRIVATE NETWORK SUBSCRIBERS

(75) Inventor: Loc Yu, Redmond, WA (US)

(73) Assignee: AT&T Wireless Services, Inc., Redmond, WA (US)

(*) Notice: Subject to any disclaimer, the term of this patent is extended or adjusted under 35 U.S.C. 154(b) by 980 days.

(21) Appl. No.: 09/867,989

(22) Filed: May 30, 2001

(51) Int. Cl.
*H04M 11/10* (2006.01)

(52) U.S. Cl. .................................. 455/413; 455/560
(58) Field of Classification Search ............... 455/413, 455/560, 415, 433; 379/88.12, 88.16
See application file for complete search history.

(56) References Cited

U.S. PATENT DOCUMENTS 6,295,552 B1 * 9/2001 Shibata .................... 379/88.13
6,389,276 B1 * 5/2002 Brilla et al. ................ 455/413
6,418,307 B1 * 7/2002 Amin ........................ 455/413

* cited by examiner

*Primary Examiner*—Creighton Smith
(74) *Attorney, Agent, or Firm*—McIntyre Harbin & King

(57) ABSTRACT

An apparatus and a method that enable private network providers to offer public network voicemail service. In the private network, a status indicator indicates the subscriber's availability to receive calls, and a controller outdials and/or issues signaling commands to the public network. A status register in the public network, being controllable by signaling commands, determines whether incoming calls are processed normally or routed to voicemail. When a call to the private network goes unanswered, the controller sets the public status register to route calls to the subscriber's public mailbox, and then establishes a link between the incoming call and the public voicemail. The public status register is reset either immediately after establishing the link or after call termination. When the private network subscriber desires to retrieve voicemail, the controller also sets the public status register to effects re-routing of incoming calls to public voicemail system during message retrieval.

14 Claims, 6 Drawing Sheets

|  | PUBLIC NETWORK MOBILE IDENTIFICATION NUMBER | PRIVATE NETWORK SUBSCRIBER IDENTIFICATION NUMBER |
|---|---|---|
| SUBSCRIBER 1 | 212-600-1234 | 700-5678 |
| SUBSCRIBER 2 | 212-600-3576 | 700-5679 |
| SUBSCRIBER 3 | 212-621-9237 | 700-5680 |
| SUBSCRIBER 4 | 212-638-2513 | 700-5681 |
| ⋮ | ⋮ | ⋮ |

SYSTEM AND METHOD OF PROVIDING PUBLIC VOICEMAIL SERVICE TO PRIVATE NETWORK SUBSCRIBERS

FIELD OF THE INVENTION

The present invention relates to providing voicemail service to private network subscribers, but more specifically to a system and a method that provide public network voicemail service to a subscriber having access to both a private network and a public network.

BACKGROUND OF THE INVENTION

A private network is generally a closed communication network provided for carrying out communications between specified users, for example, internal users of an enterprise. Private networks improve security, efficiency, and flexibility of communications between such internal users. There are also private networks in the marketplace that provide communication service to a specific subset of public network subscribers where each private subscriber is a public network subscriber and therefore has a public network mobile identification number (MIN), for example 212 600-1234. At the same time, each of these subscribers is also a private network subscriber and therefore has a private network subscriber identification number, for example 700-5678.

Figure 1:
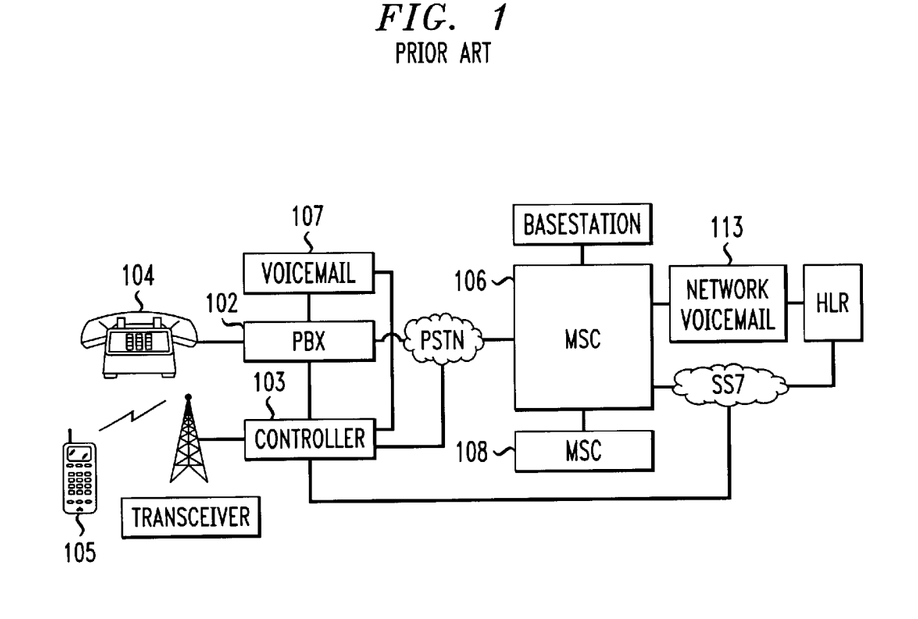
FIG. 1 is a block diagram illustrating a private network in communication with a public network in accordance with a prior system.

FIG.1 shows a block diagram of a private network having a communication link with a public network in accordance with a prior system. The private network enables wireless and wire-line communication within the private network, as well as wired communication between the private and public networks. When assurance of security is an important issue, the private network may be configured to permit access only by authorized subscribers. Private branch exchange (PBX) 102 provides an access point to the private network by the subscribers 104 and 105, and a controller 103 provides overall control of the private wireless network, including authenticating incoming calls. Controller 103, such as a wireless office service (WOS) controller provided by AT&T, functions as a PBX that controls the private network. A WOS controller is similar to a mobile switching center (MSC) 106, but on a smaller scale, and controls the private network's base station(s), communicates with the public network to authenticate calls, and also registers a subscriber when he/she becomes active. WOS controller 103 also has a signaling capability in order to interface with and control certain functions of the public network, the private PBX 102, and the private base stations. In short, WOS controller 103 provides control signaling and voice traffic management for the private wireless network.

Private networks, including wireless and wire-line networks, do not usually have a direct connection to access public network voicemail system 113. When a call to a private network subscriber (when that subscriber is registered on the private network) is not answered, private branch exchange 102 switches the call to private network voicemail system 107 to receive and store messages in a voice mailbox. Likewise, when a call to a public network subscriber goes unanswered, voice messages are routed to and stored in a voice mailbox of the public network voicemail system 113. An inconvenience encountered by subscribers having access to both a public and private network is a requirement to check his or her voice mailbox both in voicemail system 107 and in voicemail system 113 in order to retrieve all messages. This inconvenience often prevents a private network provider from offering public network voicemail to its subscribers when they are also using a private network.

Another system that provides voicemail service to private network subscribers uses an interface, such as a Primary Rate Interface (PRI) that directly connects the private network to a public network. A PRI is similar to ISDN, or T1 lines. It is a dedicated 'voice' line with signaling or control capability between two switches. It is, however, not necessary to use PRI in many instances since any dedicated line between the private and public networks will suffice. Because the PRI uses a dedicated line, there is usually very minimal security risk. The issue is usually a potentially prohibitive cost to run a dedicated line from an office building to an off-site voice mailbox location, especially if it is across the country. Although the PRI saves a subscriber from a need to check two voicemail systems to retrieve messages, the minimal security risk that arises by interconnecting the public and private networks still may be unacceptable to some private network providers.

SUMMARY OF THE INVENTION

In accordance with one aspect of the invention, there is provided a system that provides public network voicemail service to a subscriber of both a private and a public network. The public network includes a voicemail system and an indication register that indicates whether a call should be routed to voicemail. The private network includes a controller that provides signaling to control a function of the public network to effect routing of incoming call to voicemail, when appropriate. The indication register of the public network responds to control signaling produced by the private network to alter subscriber availability status, i.e., whether an incoming call should be routed to voicemail. So that an incoming call to an unavailable private network subscriber is properly routed to the public network voicemail system, the private network controller will issue a message that alters the status of the corresponding subscriber in the public network to a "route-to-voicemail" status and will generate an out-dialing signal to connect the incoming private network call to the voicemail system of the public network. Outdialing may, for example, be performed via a PSTN connection.

In another aspect of the invention, the private network controller includes a memory that stores an index of subscriber mobile identification numbers in the public network, as well as their corresponding identification numbers in the private network. The controller uses the memory as a cross-reference by obtaining the corresponding public network identification number needed to set the "route-to-voicemail" status of the corresponding subscriber in the public network when the private subscriber is not available.

Another aspect of the invention includes providing public network voicemail service to a subscriber of both a private network and a public network. When a call is made to the subscriber's private network identification number, such additional method may include receiving the incoming call at the private network, issuing a control signal to alter the status of the corresponding subscriber in the public network to a "route-to-voicemail" status, generating an out-dial call from the private network to the corresponding subscriber's identification number in the public network, and interconnecting the call on the private network to the public network. Because the status of public network subscriber was temporarily pre-set to "route-to-voicemail" prior to interconnecting the private network call to the public network, the public network automatically routes the incoming call to the public network voicemail system.

In accordance with yet another aspect of the invention, the method may additional include accessing a memory prior to out-dialing to the public network in order to obtain a public network identification number that is cross-referenced with the private network subscriber.

In accordance with yet another aspect of the invention, there is provided a method of providing voicemail access service to a subscriber of both a private network and a public network. When a private network subscriber desires to access his or her own voicemail, he or she transmits a voicemail retrieval or access code whereupon the private network controller transmits a control signal to the public network to change the status the corresponding subscriber on the public network to a "route-to-voicemail" status so that an incoming call to that subscriber goes directly to the voicemail system. In one embodiment, the method includes receiving the access code transmitted by the private network subscriber, issuing a control signal to the public network to change the status of the corresponding private network subscriber to "route-to-voicemail," outdialing a call from the private network to the public network in order to enter the voicemail system of the public network, and then, interconnecting the private network subscriber's call to the public network voicemail system via the out-dialed path.

Other features, aspects and advantages of the invention will become apparent upon review of the following description taken in connection with the accompanying drawings. The invention, though, is pointed out with particularity by the appended claims.

DESCRIPTION OF ILLUSTRATIVE EMBODIMENTS

Figure 2:
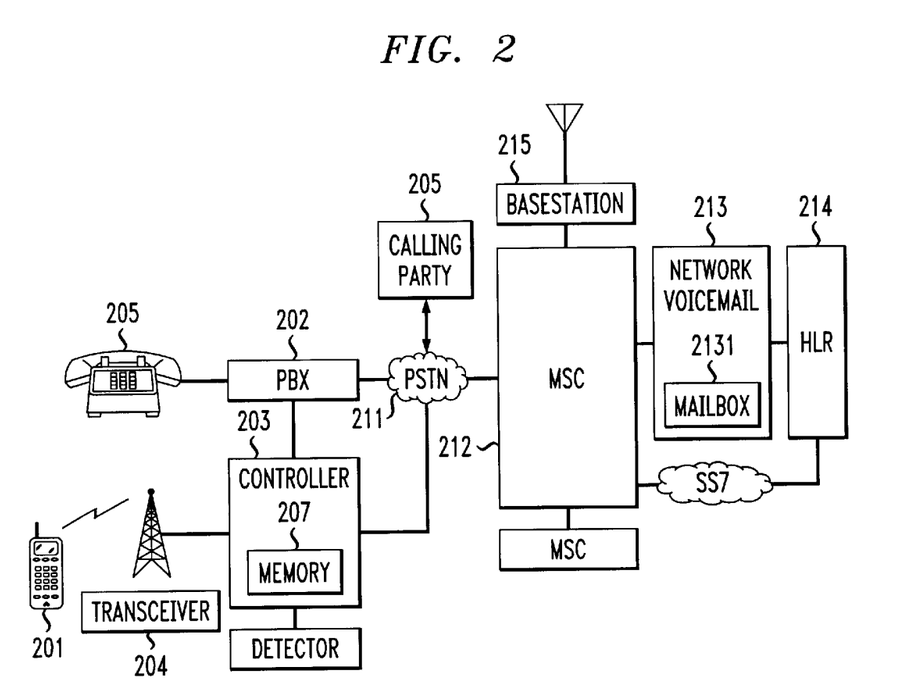
FIG. 2 is a block diagram of an illustrative system providing public network voicemail service to a subscriber of both a private network and a public network in accordance with one aspect of the present invention.

FIG. 2 shows as exemplary block diagram of a system that provides public network voicemail service to a subscriber of both a private network and a public network. The subscriber 201 is separately linked with mobile switching center 212 of the public network and with private branch exchange 202 of the private network in a well-known manner. The subscriber 201 has a mobile identification number (MIN) in the public network for example, 212 600-1234 (hereinafter "public network subscriber 212 600-1234") and also a subscriber identification number in the private network for example, 700-5678 (hereinafter "private network subscriber 700-5678").

The public network, illustratively, comprises the public switched telephone network (PSTN) 211, mobile switching center (MSC) 212, voicemail system (VMS) 213, home location register (HLR) 214, and base station (BS) 215. For clarity, only those parts of the public network that are convenient for illustratively describing the invention are shown. Mobile switching center 212, voicemail system 213, and home location register 214 communicate via a network implementing a Signaling System 7 (SS7) protocol, which is a separate land-based network which may itself have a communication link with a cellular network. The controller 203, in order to generate the necessary control conditions, communicates with the signaling channels of PBX 202 and PSTN 211, or any equivalent signaling path thereof.

The mobile switching center 212 performs switching functions related to call delivery and is interconnected with the public switched telephone network 211, the voicemail system 213, the home location register 214 and the base station 215.

The home location register 214 maintains a data base, profile record and/or call routing information or a pointer to the call routing information for subscribers in a particular assigned home area.

The voicemail system 213 further comprises a voice mailbox for each subscriber, for example, voice mailbox 2131 for public network subscriber 212 600-1234. The voicemail system 213 is operatively in communication with the mobile switching center 212 and home location register 214. When a call is made to a subscriber of the public network, for example to public network subscriber 212 600-1234, from a calling party 205 and the public network subscriber 212 600-1234 does not answer, the mobile switching center 212 switches the call to the voicemail system 213 which requests the calling party 205 to leave a message. Such message is stored in the voice mailbox 2131 of public network subscriber 212 600-1234, along with information including, for example, the time of calling, calling party ID number, and if available, the name of the calling party. The voicemail system 213 then sends a voicemail notification, through mobile switching center 212 and base station 215, to the public network subscriber 212 600-1234, indicating that there is a voicemail message waiting in his/her voice mailbox. The subscriber may then retrieve his/her messages by dialing, for example, a voicemail retrieval request code and, if required, a personal identification number (PIN).

Included in the private network is private branch exchange 202, a controller 203, a transceiver 204, and a detector 206. The private branch exchange 202 is interconnected with the public switched telephone network 211 and the controller 203, and performs switching and/or routing functions related to call delivery within the private network and call delivery between the public network and the private network. The private branch exchange 202 switches or routes incoming calls to controller 203 and, under the control thereof, out-dials public network mobile identification numbers (e.g., 212 600-1234).

The detector 206 is coupled to the controller 203, and indicates whether a called private network subscriber is available to answer the call in a well-known manner. Detector 206, for example, may comprise a register that maintains a database of registration information received from subscribers of a particular private network.

Figure 3:
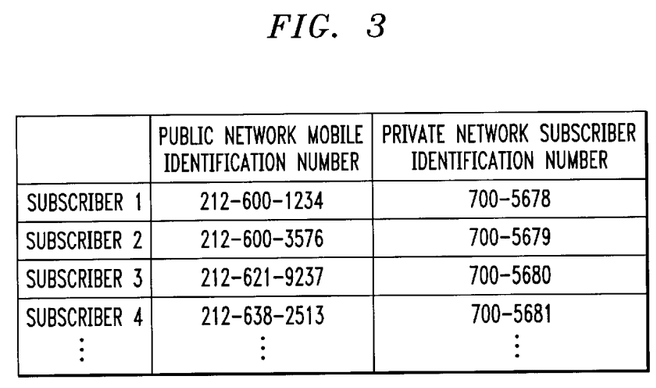
FIG. 3 shows an index of subscribers' public network mobile identification numbers and their corresponding private network subscriber identification numbers according to a feature of the present invention.

The controller 203 further includes a memory 207 that stores an index of subscribers' mobile identification numbers in the public network (e.g., 212 600-1234), as well as their corresponding identification numbers in the private network (e.g., 700-5678). An example of such an index is shown in FIG. 3. When a private network subscriber, e.g., 700-5678, is not available to answer a call, the controller 203 inactivates the private network subscriber's corresponding public network subscriber number, e.g., 212 600-1234, and controls the private branch exchange 202 to connect the unanswered call to the public network voicemail system 213.

When a call made by the private network subscriber 700-5678 is not answered, the voicemail system of the called party, say 700-5679, requests the calling party, i.e., the private network subscriber 700-5678, to leave a message. The controller 203 issues the public network mobile identification number 212-600-3576 instead of the private network subscriber identity number 700-567 as the caller ID, thereby directing the calling party into the proper voice mailbox of the public network voice mailbox system while assuring the security of the private network.

Figure 4A:
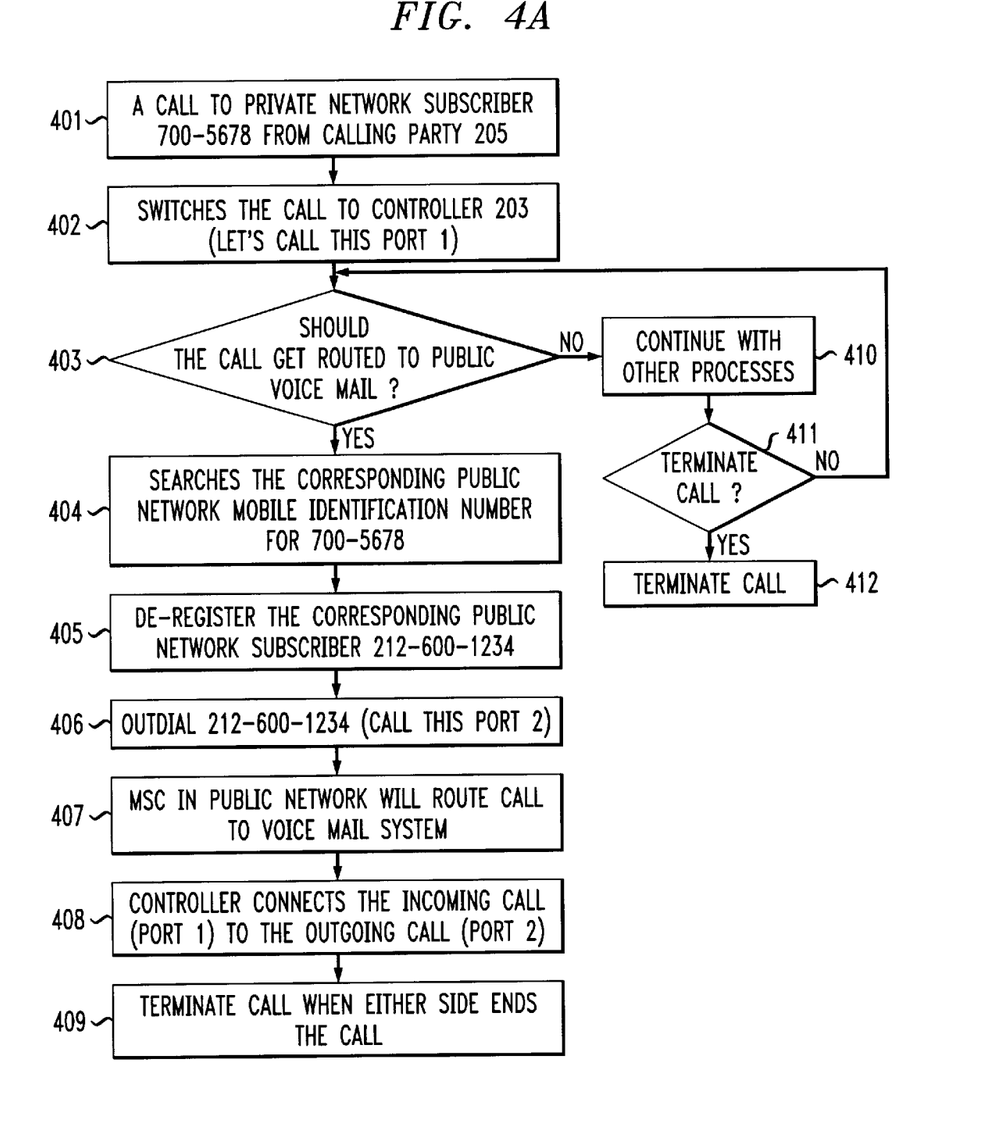
FIG. 4A is a flow chart illustrating a method of linking an unanswered call, which terminates in a private network, with a public network voicemail system according to an aspect of the present invention.

FIG. 4A is a flow chart illustrating a method of linking an unanswered call in the private network to a public network voicemail system. For simplicity, an illustrative method is described with respect to the system shown in FIG. 2.

With reference to FIGS. 2 and 4A, a calling party 205 makes a call to private network subscriber 700-5678 (401) whereupon the private network exchange 202 switches or routes the incoming call to controller 203 (402). At some point thereafter, detector 206 detects whether the subscriber (i.e., the called party) is "unavailable" in a sense that a decision is made whether the incoming call should be sent to the voice mailbox of the private network subscriber 700-5678 (403). Examples of unavailability include situations where the subscriber's "do not disturb" feature is active, the subscriber's line is busy, etc. If the detector 206 indicates that the call to the called private network subscriber 700-5678 should not go to voicemail, other call processes are continued (410), which processes may include completing the call to the called subscriber. If the detector 206 indicates that the call to the called private network subscriber 700-5678 should be sent to voicemail, the controller 203 effects a series of operations to access the public network voicemail system 213.

In order to accomplish this, the controller 203 searches the index stored in the memory 207 for the mobile identification number of the corresponding public network subscriber of the private network subscriber 700-5678, and finds 212 600-1234 (404). The controller 203 then signals the public network to de-register (or alternatively uses MS Busy after the call is setup) the public network subscriber 212 600-1234 in the home location register 214 (405). In one embodiment, controller 203 notifies the home location register 214 by an MSINACT message, which effects de-activation (e.g., by setting the status of a flag) of a particular subscriber, and in response, an IS-41 message, for example, is relayed to the home location register 214. Controller 203 also controls the private branch exchange 202 to out-dial the mobile identification number 212 600 1234 of the corresponding public network subscriber of the called private network subscriber 700-5678 (406). Because the public network subscriber 212 600-1234 has been flagged as inactive at step 405, the mobile switching center 212 automatically routes the call out-dialed by the private branch exchange 202 to the public network voicemail system 213, specifically, voice mailbox 2131 of public network subscriber 212 600-1234 (407). The private branch exchange 202 connects the incoming call from the calling party 205 and the out-dialed call to the public network voicemail system 213 by establishing a communication link between the calling party 205 and the public network voicemail system 213 (408). The calling party 205 leaves a message in voice mailbox 2131 following the instructions of the public network voicemail system. The call is terminated when either side ends the call (409). In addition, when the calling party hangs up, or the voice mailbox 2131 times out, the controller 203 signals the public network to re-activate the public network subscriber 212 600-1234 in the home location register 214 (411). In the illustrated embodiment, controller 203 notifies the home location register 214 by an MS-Registration message, which effects registration of a particular subscriber.

Since the controller de-registered the subscriber in the HLR, it may attempt to re-register the subscriber in the HLR. This allows any subsequent call to the subscriber to obtain access to the subscriber instead of going to voicemail. However, the subscriber may have traveled outside of the private network service area during the time the call is being made to the public voicemail system. If the subscriber is no longer registered on the private network, and the controller attempts to de-register the subscriber, it may 'corrupt' the subscriber's state. Therefore, it is important that the controller only change the state of the subscriber while the subscriber is within the service area of the private network.

In addition, when a call made to a private network subscriber is not answered, the controller 203 may signal the public network to de-register, or employ any other signaling message that generates a system response that passes a call to voicemail. In the case of using an MS Busy message, the call is made before sending out this message. Using a de-activation scenario, controller 203 would send the de-activate message before making the call. Using the MS Busy scenario, the controller out-dials, and when the public network queries about the MS status, it sends an MS Busy to the public network. This effectively causes the public network to pass the call to voicemail.

Figure 4B:
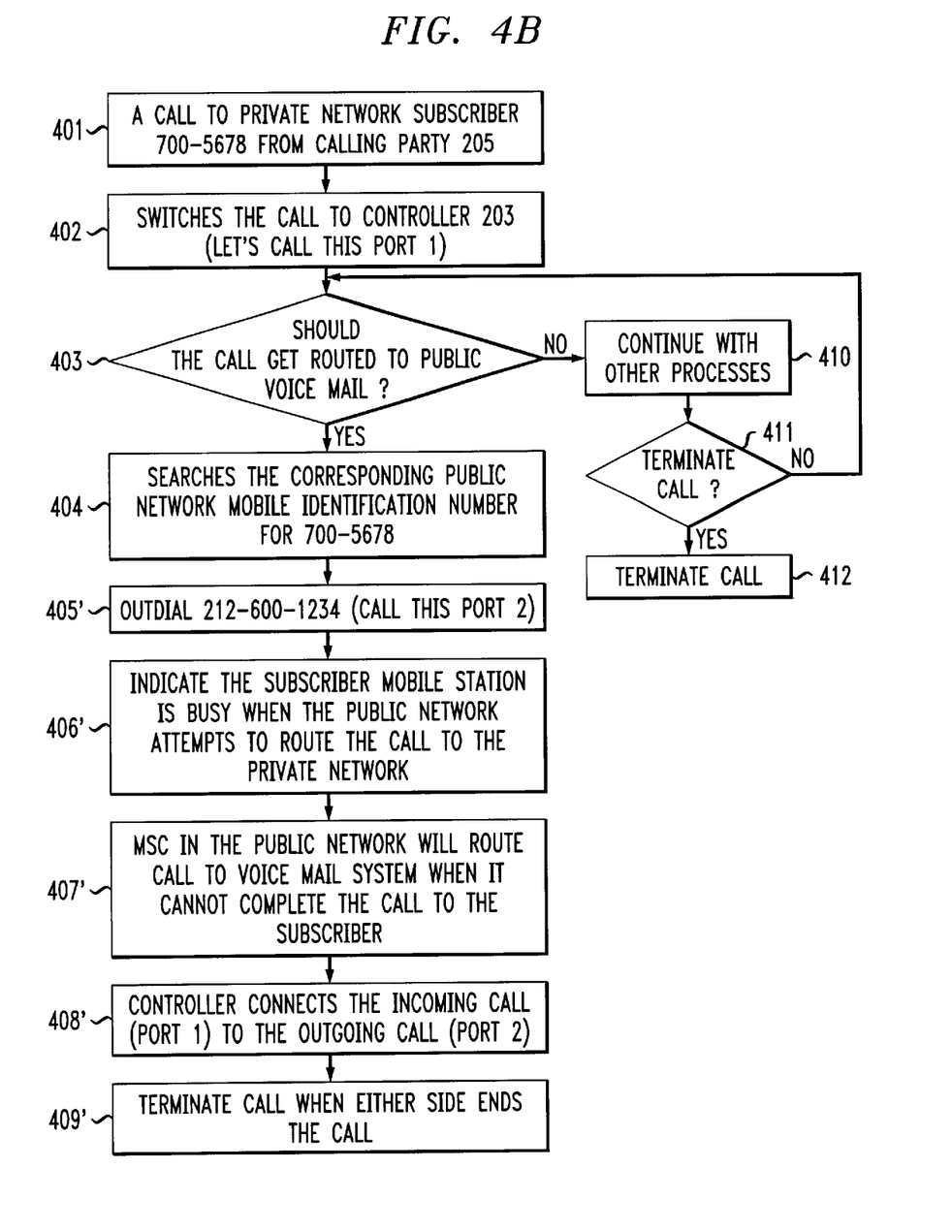
FIG. 4B is a flow chart illustrating a variation of the method illustrated in FIG. 4A.

FIG. 4B illustrates an alternative approach that may be taken after step 404 in order to handle the condition of a call being made to a private network subscriber when the call is to be routed to voicemail. Assuming the controller 203 has decided at 404 to send the incoming call to voicemail, controller 203 effects outdialing (405') to the public network at 212 600 1234. After connection is established, a flag is set to indicate to calls incoming to the public network that the called subscriber's mobile station is busy (406') whereupon the MSC in the public network routes the incoming call directly to voicemail when it cannot complete the call to the subscriber (407'). The controller 203 then connects the incoming call initially made at 401 to an established link between the controller and public voicemail system (408'). The call is terminated when either side ends the call (409').

Figure 5A:
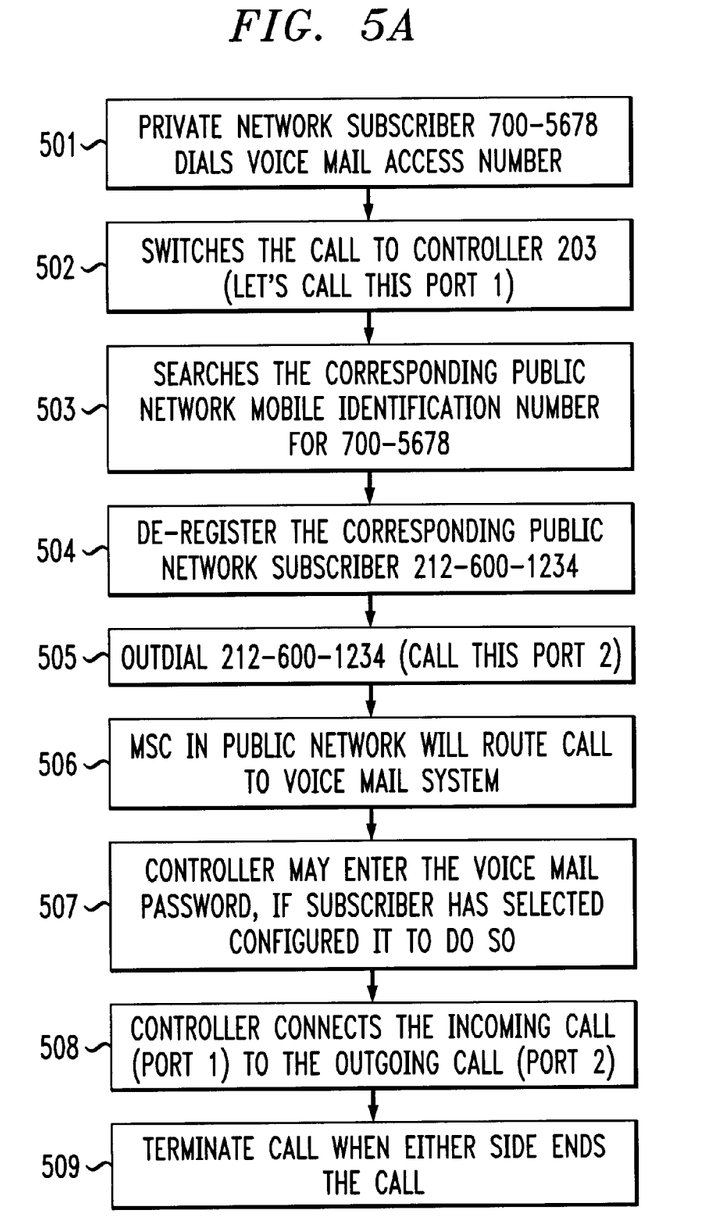
FIG. 5A is a flow chart illustrating a method of retrieving messages in a public network voicemail system by a private network subscriber according to an aspect of the present invention.

FIG. 5A is a flow chart illustrating a method of retrieving messages in a public network voicemail system by a private network subscriber according to one aspect of the present invention. For clarity, the method is also described with respect to the system shown in FIG. 2.

Referring to both FIGS. 2 and 5A, when the private network subscriber 700-5678 desires to access his/her voice mailbox, he/she dials, for example, a voicemail retrieval or access code that may, in one embodiment, be predetermined by the public network voicemail system 213. For example, the public mobile identification number for the retrieval or access code may be 212 600-1234, or "##", just as on the public network (501). Upon receipt of the dialed digits, the controller 203 realizes that the private network subscriber 700-5678 desires to access his/her voice mailbox, and performs a sequence of operations similar to the steps described above to access public network voicemail system 213 for the subscriber. In an illustrative embodiment, the controller 203 determines the public mobile identification number of the calling private network subscriber based on the dialed voicemail retrieval code (502). If the dialed voicemail retrieval code is not the subscriber's public mobile identification number, the controller 203 searches the index stored in the memory 207 (503), and finds 212 600-1234. The controller 203 signals the public network to de-register the public network subscriber 212 600-1234 in the home location register 214 (504). In one embodiment, the controller 203 notifies the home location register 214 by a MSINACT message, which effects de-activation of a particular subscriber and, in response, an IS-41 message is relayed to the home location register 214. The controller 203 controls the private branch exchange 202 to out-dial the voicemail access code from the private network subscriber 700-5678 (505). Because the public network subscriber 212 600-1234 has been flagged as inactive at step 504, the mobile switching center 212 automatically routes the voicemail access code from the private branch exchange 202 to the public network voicemail system 213, specifically, to voice mailbox 2131 of public network subscriber 212 600 1234 (506). The controller 203 may also enter the voicemail password if the subscriber has configured it to do so (507). The private branch exchange 202 connects the call from the private network subscriber 700-5678 and the out-dialed call to the public network voicemail system 213 by closing the path between the private network subscriber 700-5678 and the public network voicemail system 213 (508). The private network subscriber 700-5678 retrieves, and repeats, stores or deletes messages in the voice mailbox 2131 following the instructions of the public network voicemail system. When the private network subscriber 700-5678 hangs up, the controller 203 signals the public network to re-activate the public network subscriber 212 600-1234 in the home location register 214. This latter step may be performed as soon as the call is connected, and need not be done after the subscriber hangs up. It may also be preferable to re-register the subscriber as soon as possible. In one embodiment of the invention, the controller 203 also notifies the home location register 214 by an MS-Registration message, which effects registration of a particular subscriber. In another embodiment, the controller may send the MS identification number of the corresponding public network subscriber as the caller ID when a call from said private network subscriber is not answered.

Figure 5B:
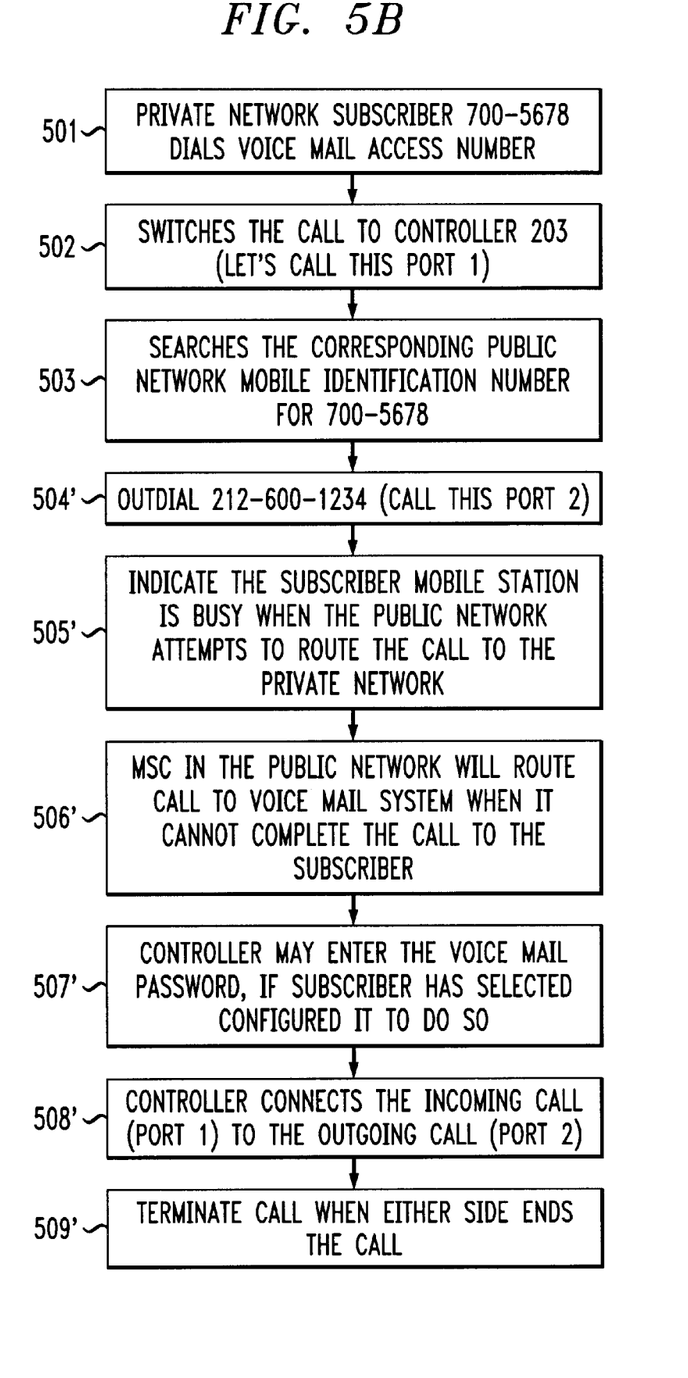
FIG. 5B is a flow chart illustrating a variation of the method illustrated in FIG. 5A.

FIG. 5B shows an alternative arrangement of process steps for retrieving messages after controller 203 searches for the corresponding MS identification number in the public network, as described relative to FIG. 5A. Upon obtaining the corresponding MS identification number for 700-5678, controller outdials 212-600-1234 (504') to access the public network voicemail system. After connection and establishing a signaling control link, controller 203 effects setting of a status flag in the public network that the mobile subscriber is busy when the public network attempts to route a call to the private network (505'). Then, the MSC in the public network routes the call to voicemail since it cannot complete the call to the subscriber (506'). If pre-configured by the subscriber, controller 203 may enter the voicemail password of the subscriber (507'). Upon accessing the voicemail system of the public network, controller 203 connects the incoming call from the private network subscriber with the outgoing call to the public network voicemail system (508'). Controller 203 terminates the link with the subscriber and the public voicemail system when either side ends the call (509').

Controller 203 may implement its functions in many ways, depending on how a system designer desires to implement this aspect of the invention. The control signal issued by the controller may, for example, include a de-activation or a MS Busy signal. Also, depending on the implementation algorithm, the sequence of events may differ. Nevertheless, the switch automatically routes or directs a voicemail access request from the private branch exchange to the public network voicemail system, whereupon the private branch exchange connects the call from the private network subscriber and the out-dialed call to the public network voicemail system. In addition, the retrieval request code used for accessing the voice mailbox may, but need not, be predetermined by the public network voicemail system. The retrieval code could, for example, include the MIN, or a common voicemail access number.

It should be noted that there are many ways to generate a condition via signaling to effect connection of a subscriber's call to voicemail. One way is to de-activate the MS, and another way is to designate the MS as busy. There may be other signaling procedures in other protocols, other than a IS-41 protocol, that generate such a condition. Thus, the invention is not limited to the illustrative methods and system described herein.

Although the present invention has been described with respect to operating in an exemplary Global System for Mobile Communication (GSM) public network environment, the invention may also be implemented with respect to any appropriate wireless communication system, for example, the Advanced Mobile Phone System (AMPS), Digital Advanced Mobile Phone System (D-AMPS), Code Division Multiple Access (CDMA), Pacific Digital Cellular (PDC) System, etc. In addition, it is known that functions of a switch may be implemented by a routing or even higher-level layer in a communication system. Accordingly, the term switch or switching as used herein includes routing and higher-level coupling of information paths.

What has been described is merely illustrative of the present invention. Various modifications and changes may be made thereto by those skilled in the art that fall within the spirit and scope of the invention, as defined by the appended claims.

What is claimed is:

1. In a private network, an apparatus that provides voicemail service to subscribers of both a private network and a public network, the public network including a voicemail system and a status register that effects routing of an incoming call by a calling party to the voicemail system, said apparatus comprising:

(a) an availability indicator that indicates availability of the private network subscriber to receive incoming call;

(b) an out-dialer that out-dials calls to the public network;

(c) a signaling channel that sends control signal to the public network; and (d) a controller responsive to the availability indicator to issue the control signal on the signaling channel to alter the status of the status register in the public network in order to route calls to the voicemail system, to initiate outdialing by the out-dialer to establish a link with the public network, and to interconnect the call on the private network with the voicemail system of the public network over the link established by the out-dialer.

2. The apparatus as recited in claim 1, wherein the out-dialer dials the public network using a public network identification number associated with the private network subscriber.

3. The apparatus as recited in claim 2, wherein the controller further includes a memory that stores an index of subscribers' public network identification numbers and their corresponding private network identification numbers, and the out-dialer out-dials a public network identification number obtained from the memory.

4. The apparatus as recited in claim 1, wherein the controller sends to the calling party the identification number of the corresponding public network subscriber as a caller ID when the call to the private network subscriber is not answered.

5. The apparatus as recited in claim 1, wherein at least one of the public network and private network is wireless.

6. A method of providing public network voicemail service to a subscriber of both a private network and a public network, the method comprising:
   receiving an incoming call at the private network;
   altering the status of the public network to route incoming calls to the subscriber to voicemail;
   generating an out-dial call from the private network to the corresponding subscriber of the public network to establish a private-public network link; and
   interconnecting the incoming call on the private network with the public network via the private-public network link, whereby said incoming call is routed directly to voicemail.

7. The method as recited in claim 6, further including the step of re-setting the status of call routing in the public network after termination of the incoming call on the private network.

8. The method as recited in claim 6, further including, in the generating step, accessing a memory to obtain a public network identification number corresponding to the private network subscriber.

9. A method of providing voicemail access to a subscriber of a private network and a corresponding subscriber of a public network, the method comprising:
   receiving a voicemail retrieval request code from the subscriber at the private network;
   altering the status of the public network to route incoming calls to the corresponding subscriber to a voicemail system;
   generating an out-dial call from the private network to the corresponding subscriber of the public network to establish a private-public network link; and
   interconnecting the private network subscriber to the public network voicemail system via the private-pubic network link, whereby to provide voicemail access.

10. The method as recited in claim 9, further including re-setting the status of the public network to process incoming calls to the corresponding subscriber after the interconnecting step.

11. The method as recited in claim 9, further including, in the generating step, searching a database of identification numbers to obtain a corresponding public network identification number associated with the subscriber on the private network.

12. The method as recited in claim 9, wherein said voicemail retrieval request code is the identification number of the corresponding subscriber on the public network.

13. A method of providing voicemail access to a subscriber of a private network which is also a corresponding subscriber on a public network, the method comprising:
   receiving at the private network a voicemail retrieval request code from the subscriber of the private network;
   setting the status of the corresponding subscriber on the public network to route incoming calls to a voicemail system of the public network;
   searching a database to obtain a public network identification number of the corresponding subscriber on the public network;
   using the public network identification number to generate an out-dial call from the private network to the corresponding subscriber of the public network thereby to establish a private-public network link;
   interconnecting the private network subscriber to the public network voicemail system via the private-public network link; and
   re-setting the status of the corresponding subscriber on the public network to process incoming calls after the interconnecting step.

14. A method of providing public network voicemail service to a subscriber of a private network and a public network having a voicemail system, the subscriber having a private network number and a public network number, the method comprising, upon receiving a first call to the private network:
   de-activating the public network number;
   out-dialing a second call from the private network to the public network using the public network number;
   directing the second call to the public network to the voicemail system;
   connecting the first call and second call together; and
   re-activating the public network number.

* * * * *